Aug. 6, 1935.  B. SASSEN  2,010,377

HYDRAULIC POWER UNIT

Filed Dec. 26, 1930  4 Sheets-Sheet 1

Inventor
BERNARD SASSEN by H. K. Parsons
Attorney

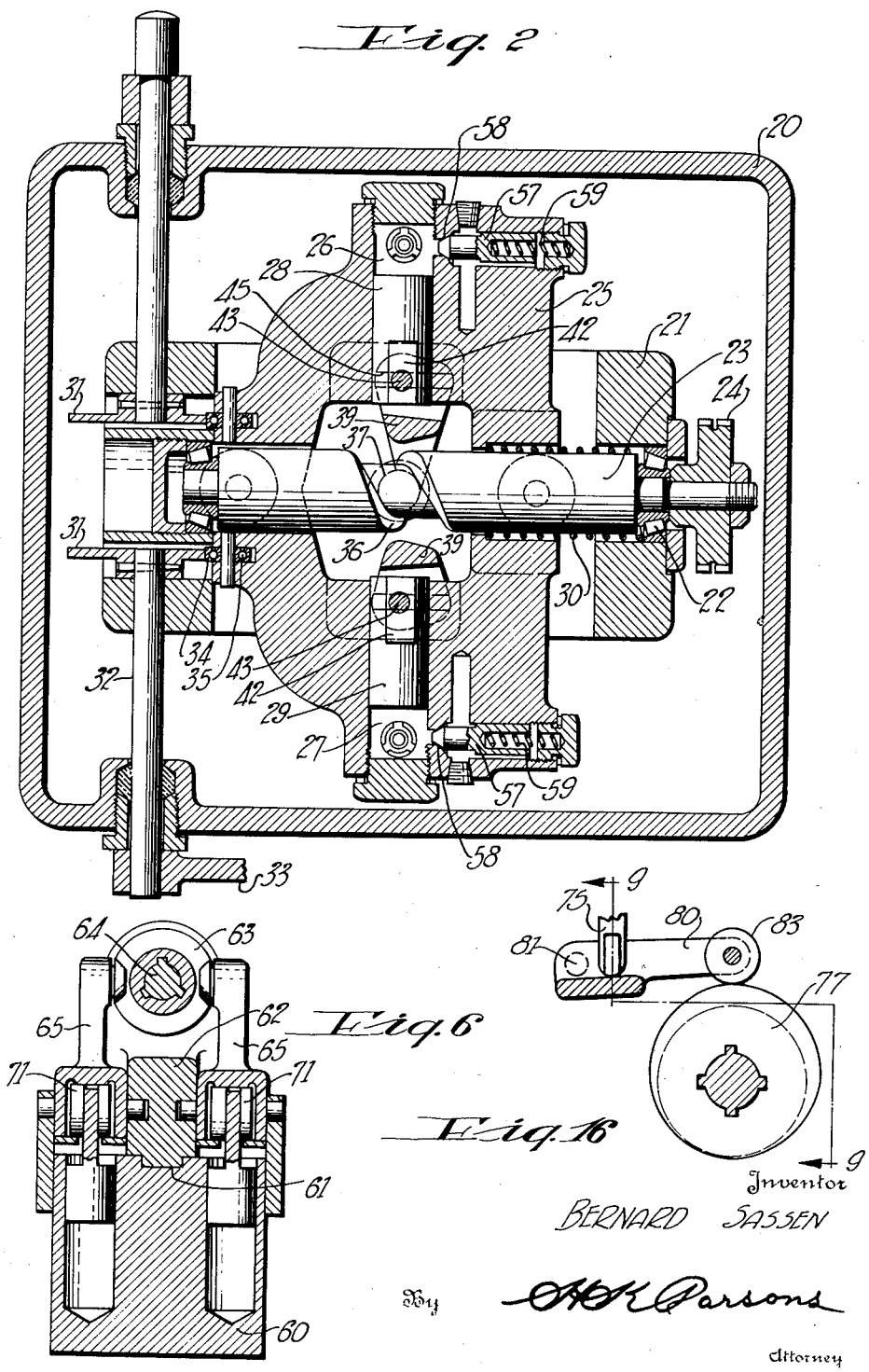

Aug. 6, 1935. B. SASSEN 2,010,377
HYDRAULIC POWER UNIT
Filed Dec. 26, 1930  4 Sheets-Sheet 3
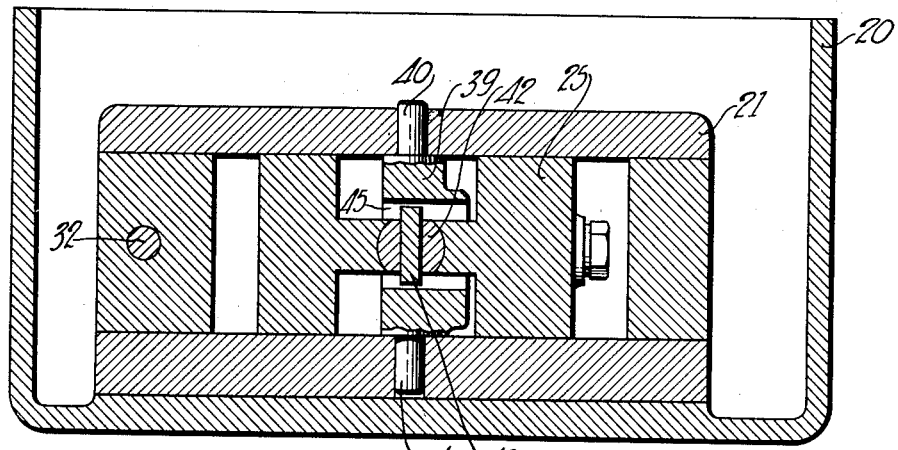
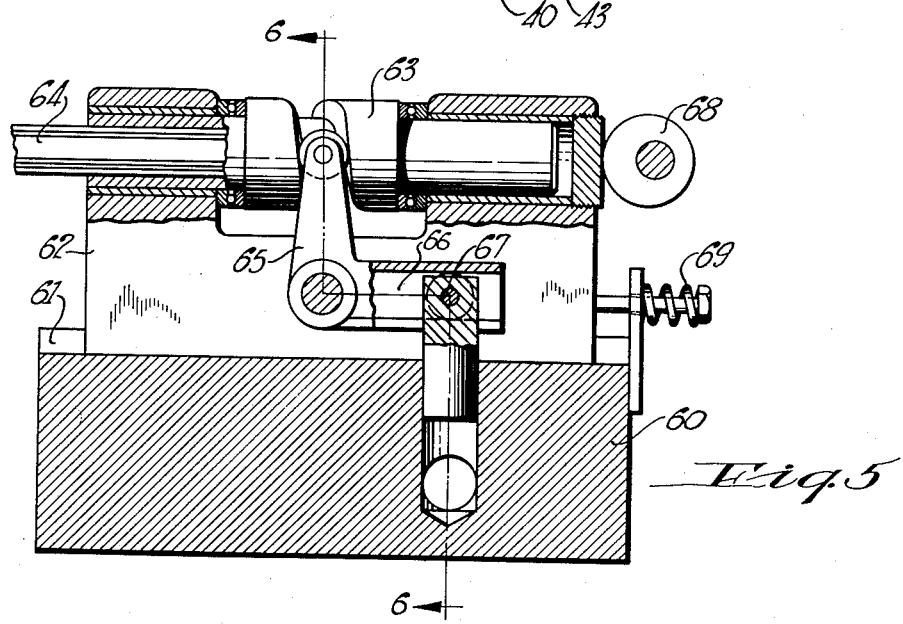
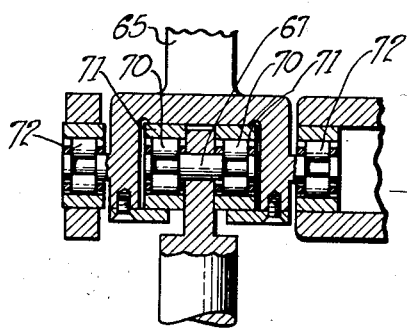
Inventor
BERNARD SASSEN
By H. K. Parsons
Attorney

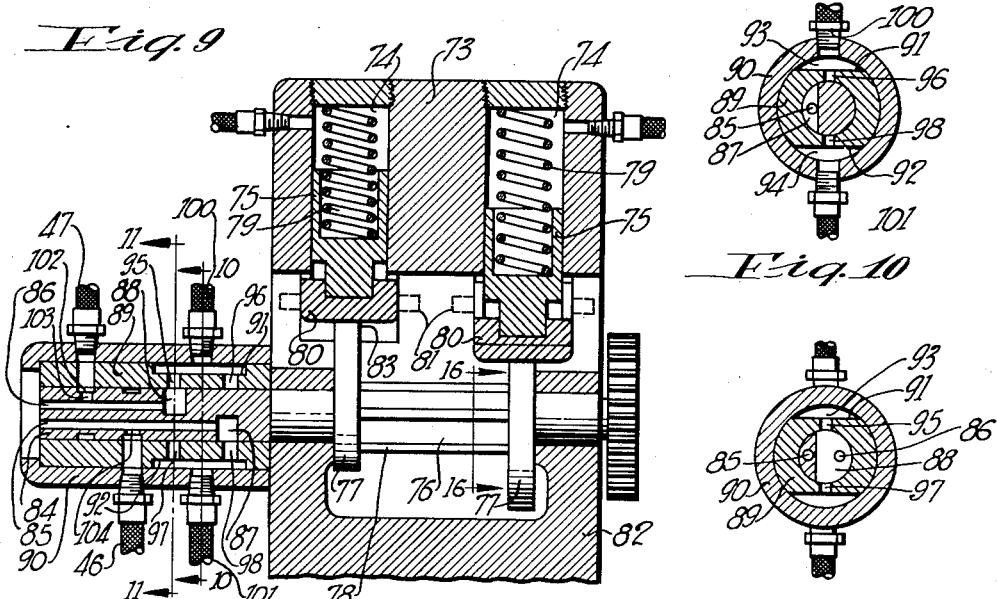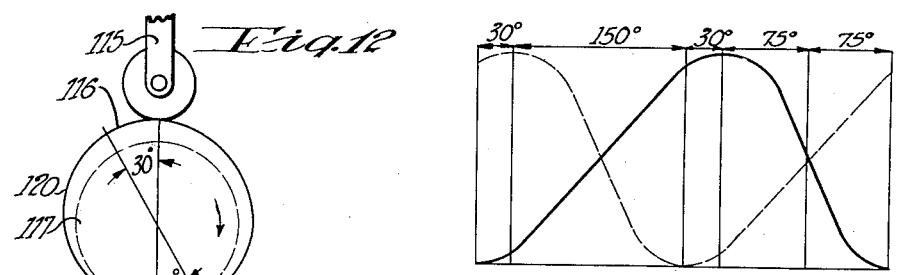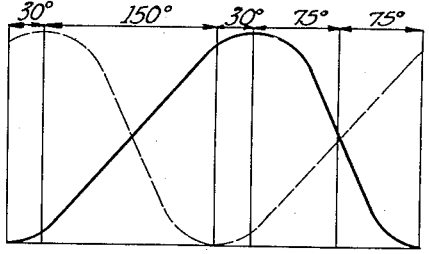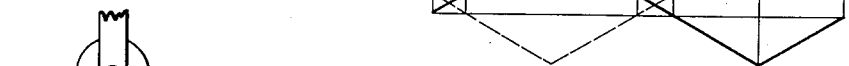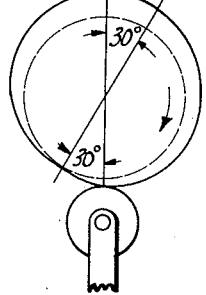

Patented Aug. 6, 1935

2,010,377

UNITED STATES PATENT OFFICE 2,010,377

HYDRAULIC POWER UNIT

Bernard Sassen, Cincinnati, Ohio, assignor to The Cincinnati Milling Machine Company, Cincinnati, Ohio, a corporation of Ohio Application December 26, 1930, Serial No. 504,802

10 Claims. (Cl. 103—213)

This invention relates to hydraulic power units and has particular reference to a mechanism adapted for use either as a pump for determining or effecting flow of an hydraulic medium, or as a motor actuable by flow of an hydraulic medium to produce rotary mechanical motion.

One of the principal objects of the present invention is the provision of a mechanism of this nature which will insure a continuous or non-pulsating power flow, and which will therefore be particularly suitable for use in machine tool feeding mechanism or other power actuations where hydraulic actuation is desired and accuracy of operation of the machine, or the finished product therefrom might be deleteriously affected by intermittent pulsating or vibrational actuation thereof as is frequent with ordinary hydraulic actuating mechanisms.

A further object of the present invention is the provision of an improved unit of this character which shall be extremely simple and compact in form, and shall attain the desired result through utilization of a minimum of moving parts.

An additional object of the invention is the provision of an improved actuating mechanism for the pistons or plungers of an hydraulic unit effective to secure a continuous power flow with overlapping of the impulse movements of the pistons when but a single pair thereof are being utilized.

An additional object of the present invention is the provision of a unit of the nature above set forth which shall be capable of adjustment by fine increments from zero to maximum output position to secure varying rates of movement as desired, while maintaining the same constant or non-pulsating output effect for all of said rates.

Other objects and advantages of the present invention should be readily apparent by reference to the following specification considered in conjunction with the accompanying drawings illustrative of certain embodiments thereof, and it will be understood that I may make any modifications in the specific structural details hereinafter disclosed, within the scope of the appended claims, without departing from or exceeding the spirit of the invention.

Figure 2 is a transverse sectional view as on the line 2—2 of Figure 1.

Figure 4 is a section taken on line 4—4 of Figure 1, particularly illustrating the pivotal mounting of a piston actuating arm and the coupling of the piston therewith.

Figure 5 is a vertical sectional view of a modified cylinder arrangement.

Figure 6 is a sectional view at right angles to Figure 5, taken as on the line 6—6 of said figure.

Figure 7 is a fragmentary enlarged view showing the connection between the piston pin and actuating arm therefor, as viewed on the line 9—9 of Figure 16.

Figure 9 is a longitudinal sectional view of a two cylinder opposed motor pump unit actuable by a peripheral in place of barrel cam, together with power driven valve mechanism therefor.

Figure 10 is a section through the valve mechanism on the line 10—10 of Figure 9.

Figure 11 is a similar section on line 11—11 of said figure.

Figure 12 is a diagrammatic view illustrating the control cam mechanism for the plungers at a point when one of the pistons is at the inception of a pump power stroke.

Figure 13 is a similar view illustrating the position of the parts as the opposed piston reaches the limit of its power stroke.

Figure 14 is a chart indicating the cycle of movement of the individual plungers.

Figure 15 is a corresponding chart showing the velocity of piston movements and consequently the positive displacement and negative intake thereof during a cycle of movement, illustrating the uniform non-pulsating power flow resultant from the combined piston movements.

Figure 16 is a sectional view on the line 16—16 of Figure 9.

Figure 1:
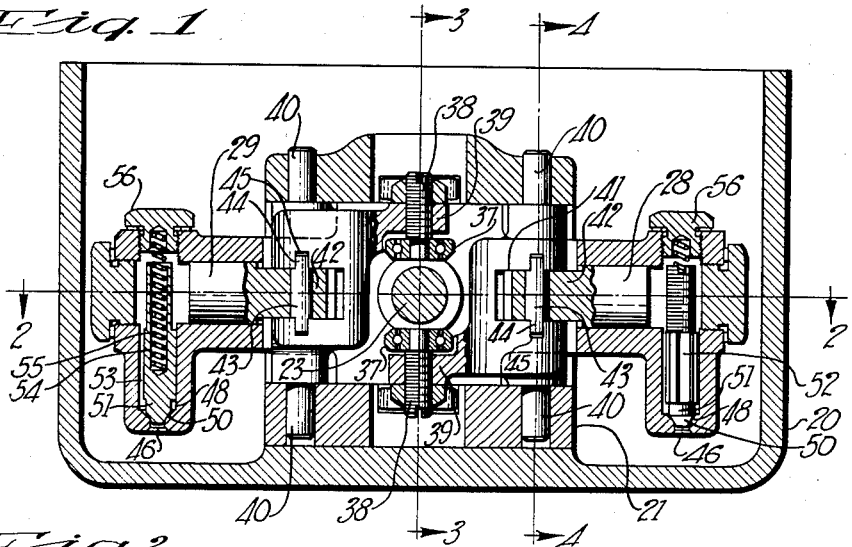
Figure 1 is a sectional view taken longitudinally through the cylinders of a unit having the pistons disposed in opposed relation, together with the actuating mechanism therefor.

In the form of the invention illustrated in Figures 1 to 4 inclusive, the unit includes a main bed member 20 having secured therein the frame 21 provided with bearings as at 22 for a mechanical power input shaft 23 driven from a suitable motor or other source through sprocket 24. Slidable within this frame 21 is the block 25 having opposed bores as at 26 and 27 forming cylinders within which are mounted the pistons or plungers 28 and 29. The block itself is normally urged toward the left as viewed in Figures 2 and 3 by the coil spring 30 which surrounds shaft 23, in neutral position maintaining the block against frame 21. Adjustment of the block to vary the pump discharge is effected by rotation of control cams 31 on shaft 32 journaled in the bed unit 20 and adjustable as by suitable handle 33 disposed exteriorly of the bed. The cams 31 preferably bear against rollers 34 journaled in the block on suitable anti-friction bearings 35 facilitating adjusting movement of the cams.

Figure 3:
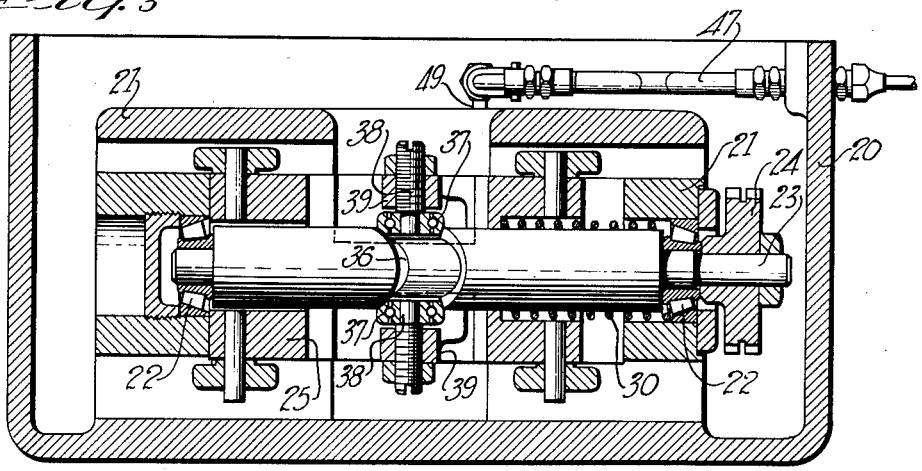
Figure 3 is a section on line 3—3 of Figure 1.

Shaft 23, as is clearly illustrated in Figures 2 and 3, is provided with a barrel cam groove at 36 receiving the anti-friction rolls 37 on studs 38 of rock arms 39 which are designed to actuate the pistons or be actuated thereby dependent on whether the unit is operative as a pump or as a motor. This cam is of special non-symmetrical configuration for determination of the relative rate and variance of phase of movement of the individual pistons with respect to each other during an operating cycle, as will be hereinafter more specifically described subsequent to consideration of the detailed mechanical construction illustrated. The rock arms or levers 39 are provided with suitable trunnions 40 rotatably engaged in frame 21, and as illustrated are of U shaped formation or slotted intermediate their trunnions 40 as at 41 to receive the flattened terminal portions 42 of the pistons 28 and 29 respectively. Rotatably supported within these flattened terminal portions of the pistons are piston pins 43 having their termini 44 slidably received within slots 45 of arms 39. These slots, as indicated in Figures 1 and 4, pass transversely of the axis of trunnions 40 in such manner that in one position of block 25, as indicated in Figure 1, the pins 43 and trunnions 40 are co-axial, so that on oscillation of arms 39 by rotation of cam 36 no motion or movement will be imparted to the piston plungers.

When block 25 is shifted axially along shaft 23, however, the pistons will be moved therewith and pins 43 laterally displaced with respect to the axis of the trunnions, sliding during this longitudinal movement in slots 45. When so displaced, levers 39 will then have a bell crank effect and as oscillated will effect a reciprocation of their respective pistons, the amount of reciprocation of an individual piston for constant cam rotation being dependent on the eccentricity of location or effective length of lever arm determined by said relative shifting of the levers and pistons. In this manner the piston strokes and consequent volumetric displacement of the unit may be adjusted and varied as desired from zero to maximum.

In this particular form of the invention there has been shown an intake line 46 and power output line 47 for transmittal of hydraulic fluid, it being understood the line 46 may be connected to a reservoir, the pump sucking up or drawing in fluid from the reservoir, or may be connected to a suitable low pressure line or source insuring positive supply to the unit and relieving it of intake load, or the unit may be submerged in oil. Pipe 46 is connected with ports 48 for the respective cylinders, while pipe or conduit 47 is connected with the cylinder block as at 49. Ports 49 of the cylinder block 25 are formed with the taper seats 50 for the valve members 51, preferably having guide splines as at 52 insuring their constant proper positioning but free sliding within tubular inlet passages 53. The valve members are recessed as at 54 to receive the closure springs 55 insertable through and whose tension may be adjusted by the cap nuts 56. It will thus be seen that upon the intake stroke of an individual piston 29 the valve, due to decrease of pressure in the cylinder, will yield, allowing the hydraulic medium to enter the cylinder and cylinder chamber through port 48. On discontinuance of the suction stroke of the piston, however, the spring 55 will tightly close and seat the valve, preventing escape of the trapped fluid. During the pressure stroke similar valve member 57 will be forced away from its seat 58 against the pressure of its spring 59 permitting this hydraulic actuating medium to be discharged through outlet 49 into pipe 47.

In Figures 5 and 6, a pump motor mechanism operating in a manner similar to that just described has been illustrated, the distinction being that in this form the cylinder block 60 is fixed to or a part of the stationary bed or frame and the cylinders are disposed in line in place of opposed. In this instance block 60 is provided with ways 61 for movable frame 62 having fixed therein the rotatable cam 63 secured against axial movement relative to the frame 62 and internally splined to engage the spline drive shaft 64 so that the member 62 may be adjusted on ways 61. Member 62 has pivotally mounted thereon the bell crank levers 65, slotted as at 66 for engagement with the piston pins 67 of the plunger pistons. Movement of member 62 in the one direction or toward the left, as viewed in Figure 5, to increase the piston stroke or unit output, is effected by rotation of cam 68 carried by the bed unit 61, while reverse movement and maintenance of member 62 in engagement with the cam is effected by suitable spring mechanism 69, the parts corresponding in effect and operation to those previously described.

The bearing structure for the piston pins, capable of utilization in connection with either of the foregoing forms of the invention, is specifically illustrated in Figure 7 as comprising suitable anti-friction bearings 70 mounted on the ends of piston pin 67 and exteriorly riding on hardened ways 71 of the actuating levers, while these levers themselves are also preferably trunnioned in suitable anti-friction bearings as at 72.

Figures 9, 10 and 11 illustrate a further embodiment of the invention in which the piston block 73 has cylinders 74 in which move pistons 75 which may be in tandem relation or axially aligned at opposite sides of the control cam or cams as preferred. In the present instance as here shown, the power shaft 76 has removably mounted thereon the peripherally operative control cams 77 which are identical in configuration but oppositely phased, whereby portions 180 degrees from each other on the cam surface are respectively effective on the individual piston plungers. This positioning of the cams on shaft 76 when a pair of cams is used is preferably effected by forming the shaft with an even number of splines 78, as for example four, and forming the cams with the necessary spline receiving grooves. Springs 79 are here utilized to maintain the piston plungers in engagement with the rock arms 80 fulcrumed as at 81 to the main bed 82 of the machine, and having the terminal rollers 83 riding on the cams 77. Transverse adjustment of the cylinder block 73 with respect to the axis of shaft 76 permits variation in the effective movement of the pistons for power rate control in a manner similar to like adjustment of the forms previously described.

In this form of the invention is also illustrated the automatic power driven valve mechanism in place of the spring valve mechanism for controlling the input and pressure lines 46 and 47. As here shown, shaft 76 drives the hollow pintle member 84 longitudinally drilled as at 85 for connection with input pipe 46, and at 86 for connection with a discharge line 47. This pintle construction, as shown in Figures 10 and 11, is such that there is a transverse slot 87 at the terminus of passage 85 extending about one third of the way through the pintle or including an arc of about 165 degrees, while at a different point longitudinally of the pintle and at a diametrically opposite side thereof is located a second slotted portion 88 in communication with the passage 86. This has a circumferential extent of approximately 195 degrees. Circumscribing the pintle is a sleeve or bushing 89 within the valve casing member 90. This sleeve is held in fixed or non-rotating position and has the diametrically opposed flats 91 and 92 thereon providing the chambers 93 and 94 intermediate the casing and sleeve. Leading from the chamber 93 to the bore of the bushing are the passages 95 and 96, while similarly inwardly extending from the chamber 94 are the passages 97 and 98. These, as will be evident from Figures 9, 10 and 11, are so located that the passages 95 and 97 will be either jointly opening into the slot 88 or one opening thereinto while the other is closed by the body of the pintle during its rotation, while the relationship of the passages 96—98 to the slot 87 is such that either one or the other may be in communication with the slot 87 but not both at the same time, while in some positions of rotation of the pintle both 96 and 98 will be blocked off by the body of the pintle.

Leading from chamber 93 through casing 90 is a conduit 100 to one of the cylinders 75, while leading from the chamber 94 through the casing is a second conduit 101 extending to the other of said cylinders. An annular groove 102 and passage 103 maintain the longitudinal pressure bore 86 in constant communication with pressure line 47, while a similar groove and passage, indicated at 104, perform a corresponding service as respects the input or intake passage 85 and circuit 46.

From the foregoing it will be noted that as shaft 76 and the attendant pintle are rotated, that during a portion of this rotation both cylinders will be open to the pressure output line and that this circuit as established or completed through the valve will be maintained during about 195 degrees of rotation of the power shaft 76, while on the contrary the cylinders will be consecutively coupled through the valve mechanism with the input line during about 165 degrees of rotation.

Figure 8:
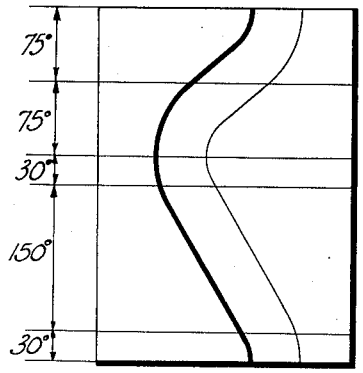
Figure 8 is a development of the cam member for actuation of the pistons or plungers in the mechanism illustrated in the preceding views.

The manner of actuation of the piston plungers for attainment of a non-pulsating hydromechanical power production will now be described, with particular reference to Figures 12 to 15 inclusive as most clearly diagrammatically illustrating the effects attained, it being understood that while the reference is here particularly made to the peripheral type cams for clarity of understanding, that the angles and effects are the same when the barrel cam of Figure 8 is utilized, attention being invited to the fact that the form of this curve from which the movement of the plungers is effected is substantially that of the plunger motion curve diagrammatically illustrated in Figure 14.

In the interests of clarity, in Figures 12 and 13 the piston plungers have been diagrammatically illustrated as opposed one to the other and in contact with a single interposed cam, it being understood that identical results are effected when two similar cams phased 180 degrees with respect to each other are utilized, each operating on an individual plunger. The position selected for purposes of illustration in Figure 12 is such that plunger member 115 is nearing its outer limit of movement as effected by the rise 116 of the cam member 117, this rise for the extent of 30 degrees being such as to produce a uniformly decelerated or slowing down outward movement of the plunger. At this point plunger 118 has reached its innermost limit of movement and is beginning to be accelerated outwardly or in a pressure direction by the initial rise 119 of the cam. This also extends through about 30 degrees and is equal but opposite to the movement effected by the portion 116 of the cam, with the result that the actions of the two plungers in jointly forcing fluid through the chambers 93—94 of the valve mechanism and slot 88 to pressure line 47 is such as to maintain a constant volumetric input in this line, while due to the overlap in pressure actions of the two pistons there is no pulsating effect or vibration. As the cam continues to rotate, plunger 115 moves down under control of portion 120 of the cam during about a 75 degree movement at a uniform negative acceleration followed by a movement under control of the portion 121 of the cam at a uniform deceleration until the zero point or limit of movement of the piston in the opposite direction is reached, after which the cycle is repeated of the rise at uniform acceleration overlapping the corresponding rise or uniform deceleration of the opposed pistons.

The effect produced by this combined action will perhaps best be understood by reference to Figures 14 and 15, Figure 14 being a plot of the actuation curve or motion of the plunger, while Figure 15 shows in full lines the delivery and intake of one piston or cylinder during a cycle of the pump or unit of time, while the dotted lines show the corresponding intake and delivery of the other cylinder. By reference particularly to Figure 15, it will be noted that the combined delivery to the two cylinders, per unit of time, is a constant or non-fluctuating amount, and that therefore there will be no pulsations in the flow of fluid from input to outlet, in the event the unit is being utilized as a pump, or correspondingly that if a constant volume of liquid is forced into the cylinders successively actuating the pistons so that their pressure effects the rotary movement of the cam for power purposes in place of the cam being driven, there will be a constant torque action.

I claim:

1. In a pump having an input and an output line, the combination with means providing a pair of cylinders, means for successively coupling the cylinders with said lines, of pistons movable within the cylinders, control means for effecting an initial uniformly accelerated movement of one of the pistons for a prescribed fraction of a cycle, additional means for effecting a constant speed movement of the piston during another fraction of the cycle, additional means for effecting uniformed deceleration in the rate of advance of the piston during a third portion of the cycle, said three portions of the cycle together being in excess of one-half a complete cycle of operation, means for actuating the other piston to effect an entire retraction thereof during the time of constant movement of the first piston, a uniform deceleration thereof during the uniform acceleration of the first piston and a uniform acceleration thereof during deceleration of the first piston whereby the power strokes of the two pistons will overlap the one with the other and a constant non-pulsating delivery will be effected in the output line during deceleration of one piston from full flow to no flow and acceleration of the next piston from no flow to full flow, and means for correspondingly varying the amplitude of reciprocations of the several pistons to control the volumetric displacement of the pump per cycle.

2. A motor-pump structure of the character described, including a cylinder block having piston receiving cylinders formed therein, pistons mounted for reciprocation in the cylinders, actuating bell crank levers having combined sliding and pivotal connections with the pistons, means pivotally supporting the bell cranks, means for effecting a relative movement between the lever pivots and the pistons for determining the offset relationship thereof and thus the amount of movement imparted to the piston for corresponding oscillation of the bell crank, cam means for causing oscillation of the bell cranks to effect predetermined reciprocating movements of the pistons but at different rates, said cam means being adjustable relative to said lever pivots, inlet and outlet conduits for the cylinder block communicating with the individual cylinders, and automatic valve mechanism effective to alternately couple the inlet and outlet conduits with the individual cylinders in timed relation to the reciprocation of the pistons.

3. A motor-pump structure of the character described, including a cylinder block having piston receiving cylinders formed therein, pistons mounted for reciprocation in the cylinders, actuating bell crank levers having combined sliding and pivotal connections with the pistons, means pivotally supporting the bell cranks, means for effecting a relative movement between the lever pivots and the pistons for determining the offset relationship thereof and thus the amount of movement imparted to the piston for corresponding oscillation of the bell crank, cam means for causing oscillation of the bell cranks to effect predetermined reciprocating movements of the pistons but at different rates, said cam means being adjustable relative to said lever pivots, inlet and outlet conduits for the cylinder block communicating with the individual cylinders, and automatic valve mechanism effective to alternately couple the inlet and outlet conduits with the individual cylinders in timed relation to the reciprocation of the pistons, said valve members including a stem portion having longitudinally extending guide splines and terminal taper seat, the cylinder block having a cylindrical aperture slidably receiving and interengaging with the splines to guide the valve member and having a corresponding taper seat for inter-fitting engagement with the seat on the end of the valve member.

4. A pump of the character described having an input and an output line including a cylinder block having a pair of cylinders formed therein, means for successively connecting said cylinders with the input and output lines, pistons movable within the cylinders, piston pins carried by the pistons, bell rank levers having one arm slidably engaging a piston pin, means pivotally supporting the bell cranks, means for effecting relative movement of the pivot supports for the bell cranks toward and from axial alignment with the piston pin whereby the stroke of the piston and thereby the discharge to the output line may be varied with respect to a constant oscillation of the bell crank, and means for controlling the oscillation of the bell crank including a rotatable cam shaft, a cam on the shaft inter-engaging with the other arm of the bell crank, said cam having a rise of relatively small extent for effecting a uniform acceleration in movement of the bell crank, continuing rise for effecting uniform deceleration, said rises comprising in excess of 180 degrees of the transference of the cam, and an additional fall for effecting more rapid reverse movement of the bell crank than that effected by the rise whereby a pulsating intake flow may be transformed to a non-pulsating output flow.

5. A pump of the character described having an input and an output line including a cylinder block having a pair of cylinders formed therein, means for successively connecting the cylinders to said input and output line, pistons movable within the cylinders, piston pins carried by the pistons, bell crank levers having one arm slidably engaging a piston pin, means pivotally supporting the bell cranks, means for effecting relative movements of the pivot supports for the bell cranks toward and from axial alignment with the piston pins whereby the stroke of the piston and thereby the volumetric discharge to the output line may be varied with respect to a constant oscillation of the bell crank, and means for controlling said oscillation including a rotatable cam shaft, and means on the shaft for actuating a pair of the levers correspondingly at 180 degrees phase, one with respect to the other, said means effecting, as respects an individual piston, an initial movement at uniform acceleration followed by a movement at uniform velocity with resultant uniform output flow, said acceleration in uniform velocity movements occupying about one-half the time of a cycle and said actuating means having a portion for further effecting during the remaining period of the cycle, a subsequent continued movement of the parts with uniform deceleration and a reversal of movement thereof which will be completed in its entirety during the remaining portion of the cycle whereby due to the 180 degree phasing of the pistons their respective acceleration and deceleration power movements will overlap twice in each cycle to produce uniform power delivery and thus a constant non-pulsating flow in the output line throughout each cycle of operation of the pump.

6. A pump of the class described having input and output lines, a pair of cylinders, means for alternately coupling the cylinders with the input and output lines, pistons movable in the cylinders, means for alternately actuating the several pistons at the same rates during their respective cycles, said means having portions effective to cause a more rapid movement of the individual pistons in one direction than in the other whereby both pistons will effect discharge into the output line simultaneously one at a uniformly increasing rate, the other at a uniformly decreasing rate resulting in a non-pulsating flow from line to line, adjustable means for changing the spacing between the pistons and said portions for varying the length of stroke imparted to the pistons while maintaining a non-pulsating flow, and means to effect adjustment of said interposed means during operation of said pistons.

7. A motor-pump structure of the character described including a first support having a pair of cylinders formed therein, pistons mounted for reciprocation in the cylinders, a second support having a shaft journaled therein, piston actuating cams mounted on the shaft, bell cranks pivoted in the second support and having a pivoted sliding connection with the pistons for transmitting motion thereto from the cams, means to effect relative adjustment between the supports to change the stroke of the pistons and thereby the rate of operation of the device, and means to maintain said rate uniform and non-pulsating including equal portions of substantially thirty degrees on the different cams but oppositely phased with respect to one another for causing uniform acceleration of the power stroke of one piston and uniform deceleration and stop of the power stroke of the other piston, and additional portions on the different cams and oppositely phased one for completing the power stroke of the uniformly accelerated piston and the other for effecting a complete suction stroke at a rate which is constantly accelerated during the first half of the stroke, and constantly decelerated to zero during the last half of the stroke.

8. A pump of the class described having input and output lines, a pair of cylinders, means for successively coupling the cylinders to the input and output lines, pistons movable in the cylinders, means for successively actuating the several pistons at the same rates during their respective cycles, said means comprising cams for effecting simultaneous pressure strokes of a pair of pistons, one at a uniformly accelerating rate, and the other at a uniformly decelerated rate whereby the delivery effect is constant and other equal cam portions for continuing the pressure stroke of one piston at uniform velocity and the other for effecting a complete suction stroke at uniformly accelerated and uniformly decelerated rates, and means interposed between the cams and the pistons for varying the spacing between cams and pistons and thereby the length of piston stroke and thus the rate of operation of the device.

9. A pump of the character described including a plurality of cylinders, an input and output line, means for successively coupling the cylinders to said lines, pistons movable in the bores of the cylinders, individual cams for effecting reciprocation of the pistons, each cam having a continuous operative cam surface including a portion for effecting movement of the piston in one direction extended through an arc greater than a semi-circle but not greater than 210°, and a portion for determining its movement in an opposite direction extending through an arc not less than 75° whereby the movement of each piston will overlap twice with that of another piston during their respective cycles to insure uniform non-pulsating flow in the output line during transference of the working load from one piston to the next, and leverage mechanism for increasing or decreasing the spacing of said cams with respect to said pistons to vary the operative effect of said cams and thereby the volume of flow without disturbing its non-pulsating characteristic.

10. A pump of the character described having input and output lines including an even number of cylinders, means for successively coupling the cylinders to said lines, pistons movably mounted within the cylinders, means for controlling the shifting movement of said pistons to render said movement equal in amount in opposite directions but not equal in time, the control means for successive pistons having a time phase displacement of 180° to effect movement of the pistons in opposite directions during a portion of the pump cycle, the difference in time required for opposite movements of the pistons causing uni-directional movements of an adjacent pair thereof during portions of each cycle whereby a uniform flow will be effected in the output line during the transference of the output load from one piston to the next and means for bodily varying the spacing between said pistons and the respective control means to vary the amount of said shifting movement without disturbing said time element, whereby the quantity of the uniform flow may be varied.

BERNARD SASSEN.